Oct. 8, 1935.  C. L. HENRY  2,016,716
BALL AND SOCKET BEARING
Filed April 16, 1934
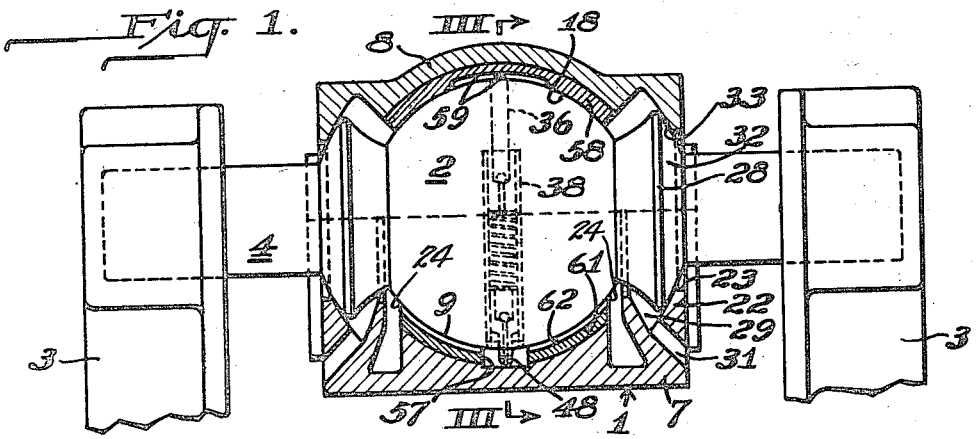
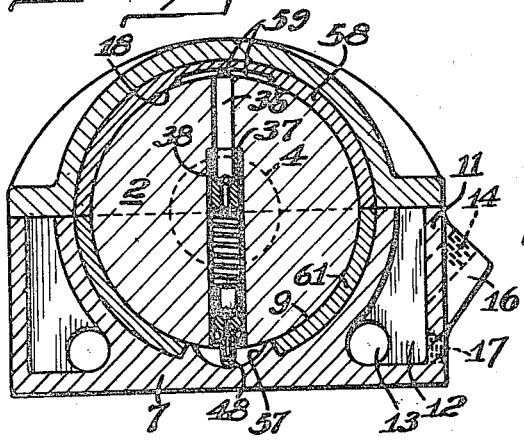
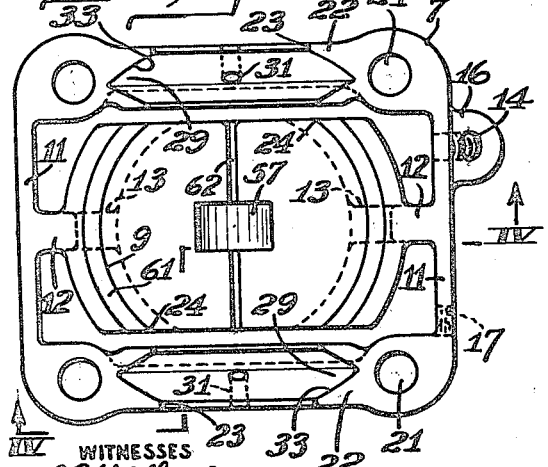
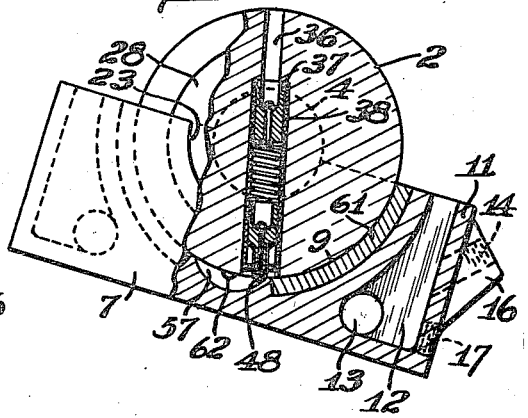
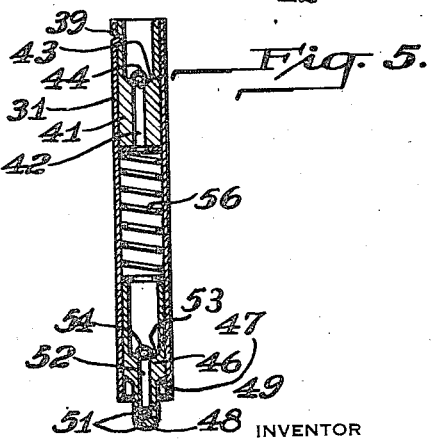

Patented Oct. 8, 1935

2,016,716

UNITED STATES PATENT OFFICE 2,016,716

BALL AND SOCKET BEARING

Charles L. Henry, Pittsburgh, Pa., assignor to Lee C. Moore & Company, Inc., Pittsburgh, Pa., a corporation of Pennsylvania Application April 16, 1934, Serial No. 720,726

7 Claims. (Cl. 308—78)

This invention relates to bearings, and more particularly to ball and socket bearings in which portions of the ball and socket are disposed in an oil reservoir.

In a ball and socket bearing wherein the lower portion of the socket is disposed in an oil reservoir, the surface of the ball which engages the immersed portion of the socket is well lubricated at all times. However, as the end walls of the bearing-housing must be provided with openings through which loosely extend connecting members that are joined to the ball, the maximum height of oil in the housing is limited by these openings. Consequently, the upper portion of the socket, and the ball surface engaging it, can not be immersed in oil and are not properly lubricated.

It is among the objects of this invention to provide an oil-reservoir-type ball and socket bearing in which the upper portions of the ball and socket are properly lubricated. Another object is to provide such a bearing in which oil is forced between the upper surfaces of the ball and socket. A further object is to provide a bearing oil pump which is automatically operated by the relative movement between the ball and socket. A still further object is to provide a ball and socket bearing in which oil is pumped through the ball from the bottom to the top of the socket.

The preferred embodiment of the invention is illustrated in the accompanying drawing, in which Fig. 1 is a side view of the bearing with the bearing-housing shown in vertical section; Fig. 2 a plan view of the bottom member of the housing; Fig. 3 a vertical section of the bearing taken on the line III—III of Fig. 1; Fig. 4 an end view of the lower member of the housing with the ball disposed therein, partly in section, taken on the line IV—IV of Fig. 2 and showing the position of the oil pump when the housing is tilted sideways; and Fig. 5 a longitudinal section of the oil pump.

Referring to Fig. 1 of the drawing, a bearing is provided comprising a bearing-housing 1 with a ball 2 movably disposed therein. The bearing is of a type especially suitable for oil-well equipment where the bearing-housing is, for example, rigidly mounted on one end of a walking beam and the forks 3 of a pitman stirrup are rigidly connected to the ends of shafts 4 projecting from diametrically opposite portions of the ball. The bearing-housing consists of a lower member or oil reservoir 7, and an upper member or cap 8.

As indicated, the lower member forms a reservoir adapted to contain a supply of oil for lubricating a ball-receiving socket 9 with which it is provided and in which ball 2 is movably disposed. The sides of the socket extend upward to the top of the reservoir (Fig. 3) and are joined to the side walls 11 of the reservoir by a pair of vertical ribs 12 integral therewith. The lower portion of each rib is provided with an aperture 13 through which oil can flow from one end of the reservoir to the other when it is filled or tilted endways.

Oil is introduced into the reservoir through a port 14 extending through a side wall thereof and obliquely upward through a boss 16 integral with that wall. The reservoir is drained through a normally closed tap 17 in the bottom of a side wall.

The upper member or cap 8 of the housing, shown in Figs. 1 and 3, is provided with a socket 18 which fits over and bears against the upper portion of the ball. The side and end walls of the cap rest on the walls of the oil reservoir to which the cap is connected by any suitable means, such as by bolts disposed in vertical bores 21 through the corners of the housing (Fig. 4). The sides of the housing are sealed against the entrance of rain and snow by means of gaskets, not shown, disposed between the side walls of the cap and reservoir.

The end walls 22 of the housing are provided with circular openings 23 through which shafts 4 extend, and the ends of each socket are provided with semicircular recesses 24 for the same purpose. The recessed ends of socket 9 are spaced from the end walls of the oil reservoir in order to permit oil to enter the socket through the lowermost portions of its recesses 24. Openings 23 and recesses 24 have a somewhat greater diameter than the shafts 4 in order not to restrict universal movement of the shafts therein, which would prevent the ball from aligning itself with the pitman connected thereto.

To prevent rain and snow, when the bearing is used in the open, from being driven by the wind through the space around each shaft 4 and into the oil reservoir where it would contaminate the oil and cause improper lubrication, corrosion and wear of the bearing surfaces, each shaft is provided adjacent the ball with an annular drip flange 28. The end walls of the housing, which are rather thick, are provided with annular recesses 29 extending radially outward from the walls of the enlarged housing openings 23 for receiving the drip flanges. The diameter of the flanges is greater than the diameter of the openings so that rain and snow driven into the openings strikes the flanges by which it is deflected and caused to run down to the bottom of the flanges from which it drips into the annular recesses. To drain the water from these recesses, the outer portions of the end walls 22 are provided with drains 31 leading to the atmosphere. The recesses 29 are large enough to permit the flanges to move in all directions therein without restriction.

To even more effectively prevent entrance of rain and snow into the oil reservoir, the outer faces 32 of the flanges and the outer faces 33 of the annular recesses 29 are formed as portions of spheres concentric with ball 2, whereby the slight clearance between the outer face of each flange and the adjacent face of the annular recess remains constant regardless of the position of the ball in its socket.

As the walking beam rocks on its central pivot the bearing-housing is tilted from one side to the other, and the oil in the reservoir lubricates substantially the entire lower socket 9 and the adjoining surface of the ball, as shown in Fig. 4. However, the only lubricant that reaches the upper surface of the ball is that which is carried up into the upper socket by capillary action, and that is insufficient for proper lubrication of the upper portion of the ball. Therefore, in accordance with this invention, means is provided for forcing or pumping oil from the oil reservoir to the top of the ball from which point the oil flows down around the ball and back into the reservoir.

Accordingly, as shown in Figs. 1 and 3, ball 2 is provided centrally with a vertical radial bore or oil-conduit 36 extending therethrough from the top of the upper socket to the bottom of the lower socket. The upper portion of this bore has a smaller diameter than the remainder of the bore, whereby an annular shoulder 37 is found therein. Inserted in the enlarged portion of this bore is an oil pump, shown in enlarged detail in Fig. 5, comprising a tube 38 frictionally engaging the wall of the bore and abutting against shoulder 37 at its upper end. Secured in the upper portion of this tube by means of interengaging detents 39 or the like is a valve member 41 having an axial bore 42 extending therethrough. The upper end of this bore is enlarged in order to form an annular shoulder 43 upwardly inclined from the smaller portion of the bore. Normally closing the upper end of the smaller portion of valve bore 42 is a ball 44 held in place by gravity.

Longitudinally reciprocable of the lower portion of tube 38 is a plunger 46 whose lower portion is reduced in diameter in order to form a shoulder 47 and a nose 48. The nose projects from the bottom of the tube, but its outward movement is limited by shoulder 47 abutting against an annular flange 49 projecting radially inward from the bottom of the tube. The tip of the nose is provided with a plurality of radial bores 51 which open into the lower end of an axial bore 52 extending upward through the remainder of the plunger body. Like bore 42 of valve member 41, plunger bore 52 is enlarged at its upper end to form an inwardly inclined shoulder 53 on which a ball 54 normally rests for closing the passage through the plunger. The plunger is normally biased away from the valve member of the pump by means of a coil spring 56 compressed between the inner ends of the plunger and valve member.

In order to reciprocate the plunger in the tube for pumping oil through the ball from the oil reservoir to the top of the ball, the central portion of lower socket 9 is provided with a depression 57 the face of which is inclined outward and upward relative to the immediately adjoining portion of the socket and transversely thereof, as best shown in Figs. 3 and 4. This depression serves the double purpose of an oil sump and of means for reciprocating the plunger the nose 48 of which is held in constant engagement with the face of the depression by spring 56.

As will be seen in Fig. 4, when the bearing-housing is initially tilted sideways relative to the ball the nose of the plunger slides up the inclined face of depression 57 which forces the plunger upward into tube 38 against the resistance of the coil spring therein. Some of the air in the tube between the plunger and valve member is forced up through the bore in the latter, ball 44 being unseated by the force of the air beneath it. As the bearing-housing again approaches its horizontal position the nose of the plunger slides down the face of depression 57 to the position shown in Fig. 3, coil spring 56 serving to force the plunger away from the valve member. This movement of the plunger away from the valve member reduces the air pressure between them to a point below atmospheric pressure, whereby ball 44 is drawn to its seat and plunger ball 54 is unseated by oil which is drawn up through bore 52 from sump 57 to take the place of the previously displaced air.

After the plunger has been reciprocated in this manner a few times, all of the air in the pump and bore 36 is forced out and its place taken by oil drawn up from the oil reservoir. Thereafter, when the plunger is pushed into the tube by the inclined face of depression 57 the oil in the pump is forced upward through the valve member, plunger ball 54 closing the plunger bore and the upper ball 54 being unseated by the rising oil. The oil in the upper end of ball bore 36 is thereby forced out of the top of the ball from which point it spreads out and runs down the ball in all directions. To aid in distributing the expelled oil over the upper surface of the ball, the babbitt lining 58 of the upper socket is provided with oil grooves 59 extending radially from the center of the socket. The babbitt lining 61 of the lower socket is likewise provided with oil grooves 62 extending from the ends of the socket to the oil sump to aid in distributing oil over the lower socket and also to insure that the oil sump will aways be full of oil.

A ball and socket bearing constructed in accordance with this invention has a longer life than those known heretofore and operates more efficiently, because all of the bearing surfaces of the ball and socket are properly lubricated at all times. The oil pump which forces the oil into the upper portion of the socket is housed in the ball itself so that the bearing is not increased in size or complicated by external pumping devices. Furthermore, the pump is automatic in operation in that the relative movement between the ball and socket operates the pump. As a consequence, the greater or the faster this relative movement, the better the lubrication. There is small likelihood of anything getting out of order in such a bearing, while the drip flanges prevent the oil in the reservoir from being contaminated by water from rain or snow.

According to the provisions of the Patent Statutes, I have explained the principle and construction of my invention, and have illustrated and described what I now consider to represent its best embodiment. However, I desire to have it understood that, within the scope of the appended claims, the invention may be practiced otherwise than as specifically illustrated and described.

I claim:

1. A bearing comprising a housing interiorly provided with upper and lower bearing surfaces, the lower surface having a depressed portion forming an oil sump, a bearing member disposed in said housing in engagement with said bearing surfaces and having a bore extending therethrough with its lower end opening to said pump and its upper end opening to said upper bearing surface, and an oil pump disposed in said bore, the wall of said sump being formed to operate said pump as the bearing member moves relative to the housing whereby to pump oil through said bore to said upper bearing surface.

2. A ball and socket bearing comprising a bearing-housing provided interiorly with upper and lower ball-receiving sockets, the lower socket having an oil sump therein, a ball movably disposed in said sockets and having a bore extending therethrough with its lower end opening into said sump and its upper end opening into said upper socket, and an oil pump disposed in said bore, the wall of said sump having a portion formed to operate said pump as the ball moves relative to the housing whereby to pump oil from the sump to the bearing surface of the upper socket.

3. A ball and socket bearing comprising a bearing-housing interiorly provided with upper and lower ball-receiving sockets, the lower socket being provided centrally with a depression forming an oil sump therein, a ball movably disposed in said sockets and having a bore extending therethrough with its lower end opening into said sump and its upper end opening into said upper socket, and an oil pump disposed in said bore and including a reciprocable plunger engaging the face of said depression, said face being formed for reciprocating said plunger in said bore as the ball moves relative to the housing whereby to pump oil from said sump to the bearing surface of the upper socket.

4. A ball and socket bearing comprising a bearing-housing interiorly provided with upper and lower ball-receiving sockets, the lower socket being provided centrally with a depression forming an oil sump therein, a ball movably disposed in said sockets and having a bore extending therethrough with its lower end opening into said sump and its upper end opening into said upper socket, and an oil pump disposed in said bore and including a reciprocable plunger engaging the face of said depression, said face being inclined outward and upward relative to the immediately surrounding portion of the lower socket for forcing said plunger upward in said bore as the projecting end of the plunger moves up said inclined face when the ball rocks relative to the housing whereby oil is pumped from said sump to the bearing surface of the upper socket.

5. A ball and socket bearing comprising a bearing-housing interiorly provided with upper and lower ball-receiving sockets, the lower socket being provided centrally with a depression forming an oil sump therein, a ball movably disposed in said socket and having a bore extending therethrough with its lower end opening into said sump and its upper end opening into said upper socket, and an oil pump disposed in said bore and including a reciprocable plunger and resilient means for biasing the lower end of the plunger against the face of said depression, said face being inclined outward and upward relative to the immediately surrounding portion of the lower socket for forcing said plunger upward in said bore as the projecting end of the plunger moves up said inclined face when the ball rocks relative to the housing whereby oil is pumped from said sump to the bearing surface of the upper socket.

6. A ball and socket bearing comprising a bearing-housing interiorly provided with upper and lower ball-receiving sockets, the lower socket being provided centrally with a depression forming an oil sump therein, a ball movably disposed in said sockets and having a bore extending therethrough with its lower end opening into said sump and its upper end opening into said upper socket, and an oil pump disposed in said bore and including a reciprocable plunger engaging the face of said depression, said face being formed for reciprocating said plunger in said bore as the ball moves relative to the housing whereby to pump oil from said sump to the bearing surface of the upper socket, and said upper bearing surface being provided with oil grooves for receiving oil from the upper end of said bore and distributing it over said ball.

7. A ball and socket bearing comprising a bearing-housing provided interiorly with upper and lower ball-receiving sockets, the lower socket having an oil sump therein, a ball disposed in said sockets and having a bore extending therethrough with its lower end opening into said sump and its upper end opening into said upper socket, an oil pump disposed in said bore and including a reciprocable plunger engaging the face of said sump, said face being inclined outward and upward relative to the immediately surrounding portion of the lower socket for forcing said plunger upward in said bore as the projecting end of the plunger moves up said inclined face when the ball rocks relative to the housing whereby oil is pumped from said sump to the bearing surface of the upper socket, shafts projecting from diametrically opposite portions of the ball, the end walls of the housing being provided with enlarged openings through which said shafts extend, and an annular drip flange projecting from each of said shafts adjacent the ball to deflect rain and snow driven into said enlarged openings, said end walls of the housing being provided with recesses extending radially outward from said openings for loosely receiving said flanges for unrestricted movement therein, and the bottoms of said recesses having drains opening to the atmosphere whereby rain and snow are prevented from entering said oil reservoir.

CHARLES L. HENRY.